United States Patent Office 3,069,619
Patented Dec. 18, 1962

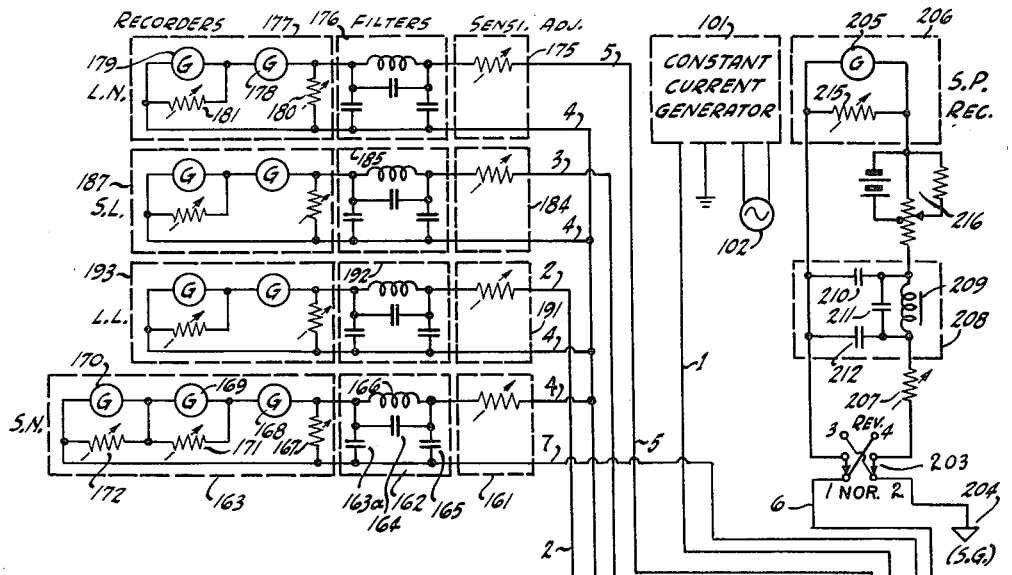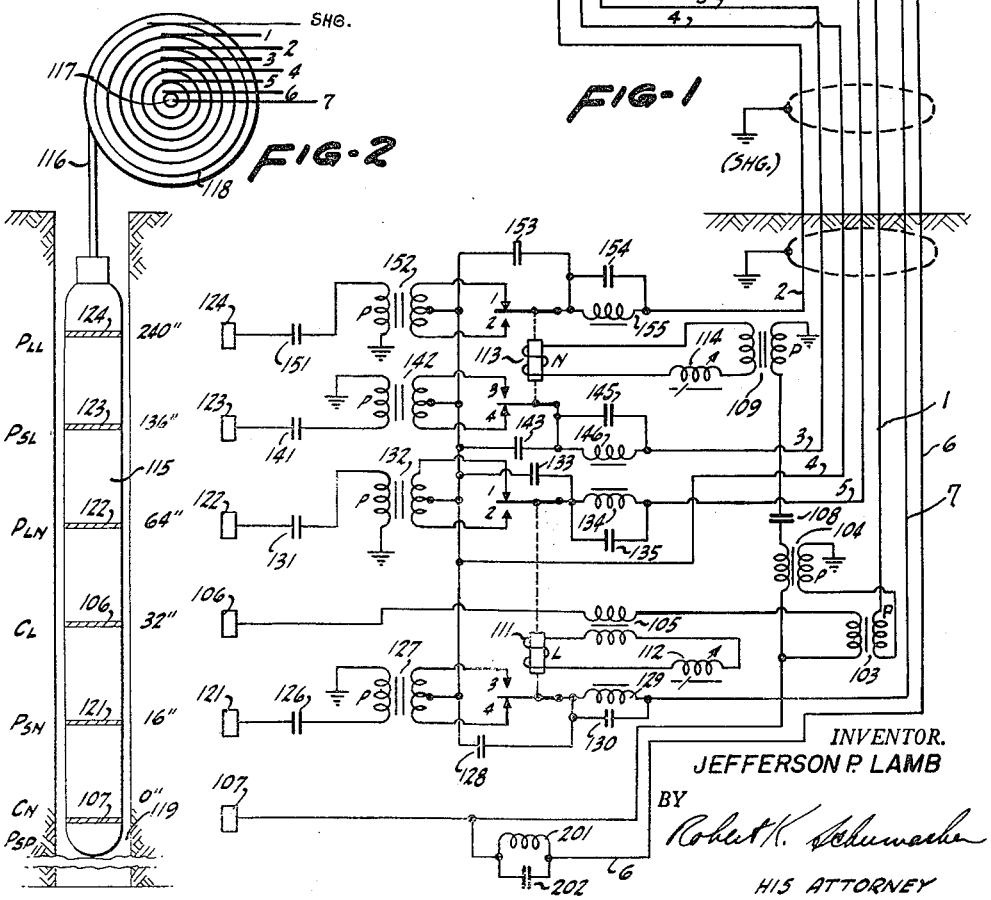

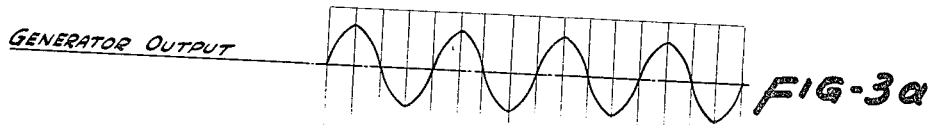
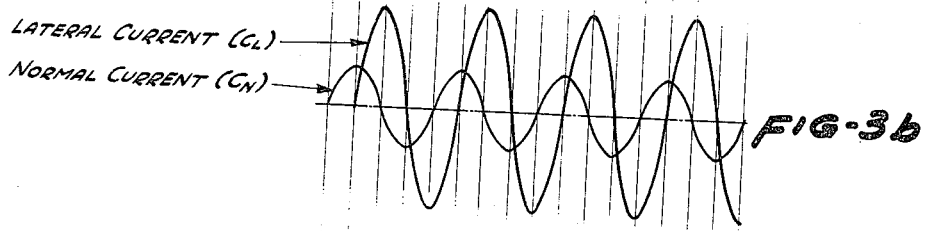
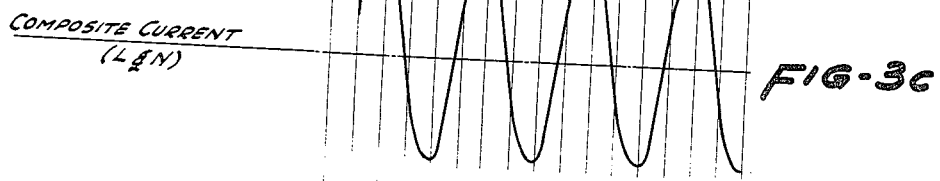
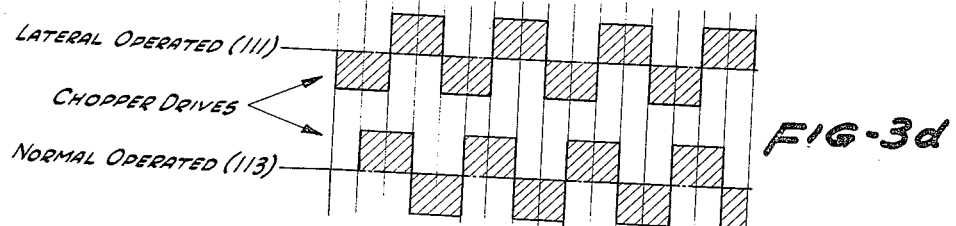
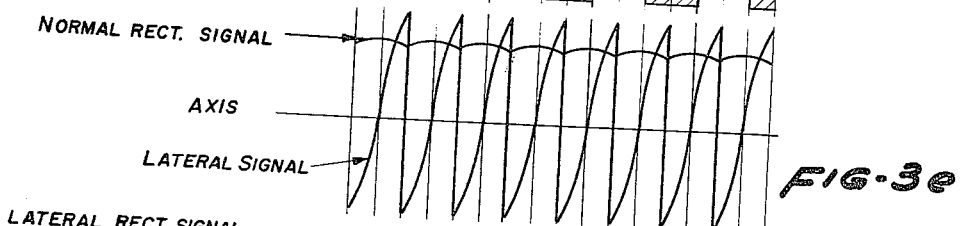
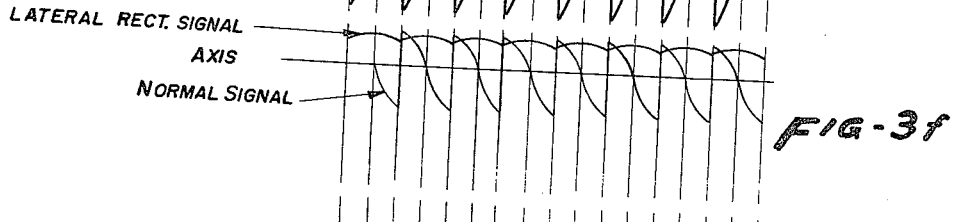
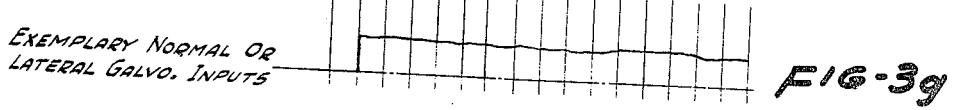

3,069,619
ELECTRICAL LOGGING SYSTEM WITH MEANS FOR RECTIFYING PHASE DISPLACED COMPONENTS OF A COMPOSITE FIELD
Jefferson P. Lamb, Tulsa, Okla., assignor, by mesne assignments, to Dresser Industries, Inc., Dallas, Tex., a corporation of Delaware
Filed Dec. 30, 1959, Ser. No. 862,937
6 Claims. (Cl. 324—1)

This invention relates to electrical logging systems and more particularly to resistivity logging systems which require that more than one field be established in the subsurface formations.

In the early development of the electrical logging industry, it was conventional to establish a current flow between a single current electrode suspended in a borehole and a remote ground, and then sample the resultant field at some reasonably close location to obtain a signal correlatable with the resistivity of the subsurface formation adjacent the electrode array. Since this simple beginning, electrical logging systems have become increasingly complex. At the present time, it is considered desirable, if not mandatory, to provide a plurality of resistivity curves as well as a spontaneous potential (S.P.) curve thereby to more accurately identify the lithology of subsurface formations. More particularly, current general practice is to provide both so-called normal and lateral curves.

It is felt by most users of electrical logs that the shallow penetration of a normal electrode array and the deeper penetration of a lateral electrode array provide different significant parameters of the oil bearing properties of formations surrounding a borehole. Moreover, the recognized advantages of lateral and normal resistivity surveys are usually complemented by the S.P. survey which measures the natural potentials of the earth strata.

To provide an electrical logging system which not only measures the natural potential of the subsurface formations but also establishes alternating current fields in the formations so that values of formation resistivity adjacent the borehole and laterally displaced therefrom can be ascertained, presents a number of problems.

In the first place, whenever S.P. and resistivity surveys are made at the same time, interaction problems between electrodes, conductors, etc., as they may distort S.P. signals, place limitations on the system. Added to these particular design limitations, are others attributable to referencing lateral and normal signals to a common depth or as close to the bullhead of the logging tool as possible.

Aside from significant level differences between normal and lateral resistivity signals, due to differences in electrode separation, the lack of common depth references is the principal reason for establishing more than one alternating current field to obtain both normal and lateral parameters. If an alternating current field is established between only one pair of current electrodes (or one and sheath ground), the normal, lateral and S.P. signals will be referenced to different depths. In order to minimize depth reference corrections and to compensate for the heavier current requirements of the lateral field, it is usual to establish separate lateral and normal fields.

In most contemporary electric logging systems, it is conventional to provide curves of at least three resistivities and a spontaneous potential. One group proposed by the American Petroleum Institute consists of 16" short normal (S.N.), 64" long normal (L.N.) 10' short lateral (S.L.), 18'8" long lateral (L.L.) and an S.P. This group is used as exemplary in the electrical logging system of the present invention.

The solution to the problem of establishing two fields which probably initially commends itself is that of generating two fields and transmitting them to the logging tool over independent pairs of conductors. This is what has been done most often in prior art electrical logging systems. This solution does not get away from switching currents since it is still necessary to establish the two fields alternately so that they do not overlap. However, the switching is performed by surface commutators which are more easily designed than subsurface commutators to avoid deleterious arcing as the substantial currents are switched. A more serious disadvantage of surface commutation is that it uses a cable conductor that would otherwise be available for transmitting information signals to surface equipment.

One cable presently in use in the electrical logging industry includes seven conductors and a sheath. If it is necessary to use at least two of these conductors and the sheath for establishing the two alternating current fields in the subsurface formations and subsurface switching is to be avoided, it is possible to send information on only four parameters to the surface equipment, assuming each has a common conductor. Since one of these is an S.P. signal, it leaves the remaining four conductors available to transmit only three resistivity signals to the surface equipment. It can be appreciated that if the fields may be established by some circuit revision in the subsurface equipment so that only one of the conductors needs to be used for transmitting the alternating current to the subsurface tool, then the desired four resistivity curves may be recorded.

The present invention seeks to overcome the problems which are associated with switching of lateral and normal currents in a simple, economical and straightforward manner. Not only does the present invention utilize only one pair of conductors to convey the alternating power to the logging tool and thereby permit maximum signal information to be transmitted through the remaining conductors, it establishes two current fields in the subsurface formations without requiring any current switching which causes contact erosion and the like.

The present system obtains the lateral and normal currents from a high current, sine wave generator at the surface equipment which provides a maximum signal-to-noise ratio within the current-voltage rating of the cable and which operates at a frequency high enough to avoid complex filter design, but is still within the relatively lossless range of the cable. In order to establish the lateral and normal fields, the current flowing from the generator at the surface is applied as a composite to both lateral and normal electrode pairs but with something approaching a 90° phase of the current as between the pairs. The signal channels include phase discriminators and filters which select the wanted signal and reject the unwanted signal prior to transmission to surface recording equipment.

More particularly, the signals as detected by the lateral electrode pairs, for example, are phase distinguished by rectification. The rectifier for the lateral signals is driven by the normal current field to permit ultimate elimination of the unwanted signals. The output at the lateral channel synchronous rectifier is a D.-C. equivalent of at least a part of the lateral signal with the normal alternating current field signal superimposed thereon. These signals are thereafter filtered to eliminate the normal signals, leaving only the lateral D.-C. signals. In a similar manner, the normal A.-C. current signals are detected and rectified in response to the lateral field current to provide D.-C. equivalent signals with A.-C. lateral signals superimposed thereon. Correspondingly, the lateral A.-C. signals are eliminated by filters, and only the normal D.-C. equivalent signals reach the recording equipment at the surface.

It should be understood that it is not necessary to phase separate the lateral and normal fields by substantially 90°, but it is necessary to quite accurately coordinate the operation of the rectifying means in a signal channel with the phase of the unwanted signal at the input to the rectifying means. To permit the subsequent elimination of the unwanted component by filtering it is necessary to establish a substantially 90° phase shift between a switching of the rectifier and the unwanted signal as it appears at the input of the rectifier. This is accomplished by adjusting the phase of the current operating the rectifier. In other words, the rectifier is synchronously operated 90° out of phase with the unwanted signal. Any material deviation from this 90° relation will permit some of the unwanted signal to be rectified and combined with the wanted signal.

By utilizing phase displaced lateral and normal current fields and synchronously rectifying the detected signals as indicated, it is possible to "switch" electrodes without the usual circuit and signal degradation. Signal rectification not only overcomes many of the disadvantages inherent in transmitting signals to the surface as alternating current, e.g., interconductor cross-talk, capacitive coupling, etc., but also makes actual switching between lateral normal electrodes unnecessary. Such switching, if necessary, not only creates contact difficulties but also may introduce spurious D.-C. signals into the spontaneous potential channel.

From the foregoing general description of the present phase discriminating electrical logging system, it can be appreciated that the object of the invention is to provide a multi-curve electrical logging system which fully utilizes cable capacity and at the same time simply, economically and efficiently establishes and detects at least two alternating current fields.

Principal features of the invention pertain to means for establishing the lateral and normal fields in the subsurface formation adjacent the logging tool and means by which the phase differences are resolved to provide high levels of wanted to unwanted signal for both types of resistivity investigations.

Other features of the invention pertain to simplified surface and subsurface circuits which incorporate all the necessary functions of more complex electrical logging systems and yet reduce the complexity thereof from both a maintenance and operational standpoint.

These and other objects and features of the present invention will be more fully understood when the following detailed description is read with reference to the drawings in which:

FIG. 1 is an exemplary circuit diagram of the present electrical logging system;

FIG. 2 is a schematic representation of the relation of the logging tool, electrodes and support means; and, FIG. 3 depicts exemplary wave forms at various points of the system of FIG. 1, all of which are correlated along a time axis. More particularly, FIG. 3a represents the alternating current output of the generator, FIG. 3b represents the lateral and normal currents flowing from respective electrodes 106—107 and 107, FIG. 3c represents the composite current field established in the subsurface formation as a result of the lateral and normal current fields, FIG. 3d represents the operation of the synchronous rectifier contacts in the lateral and normal receiving channels, FIGS. 3e and 3f represent exemplary wanted and unwanted signals in the normal and lateral channels after rectification, and, FIG. 3g represents exemplary normal or lateral signal inputs to the surface receiving equipment.

Looking first to the system disclosed in FIG. 2, it can be seen to include a plurality of electrodes 106, 107, and 121–124 supported by a logging tool 115. The electrodes are marked C (current) or P (pickup) with appropriate subscripts to identify their functions. The logging tool 115, in turn, is supported for movement along borehole 119 by 7-conductor cable 116 which cooperates with a pulley mechanism 117 at the surface. Commutator device 118 separates the 7-conductors of the cable 116 for connection to various parts of the surface equipment as illustrated.

Turning now to FIG. 1, the source of laternating current 102 is supplied to the current generator 101 in the surface equipment which generates an alternating current of a constant frequency in the 100 to 400 cycle per second range. This frequency range is chosen because it reduces the complexity of filter design yet still falls in the low loss range for commercially available 7-conductor cables. The fixed frequency alternating current is transmitted to the subsurface equipment between conductor 1 and the sheath (SHG) of cable 116. The alternating current supplied over conductor 1 is connected to one side of the primary of transformer 103 in the subsurface equipment. The other terminal of the primary of transformer 103 is serially connected through the primary of transformer 104 to ground. The secondary of transformer 103 is connected at one terminal through the primary winding of transformer 105 to the lateral current (32" band) electrode 106 and at its other terminal to normal current (0" band) electrode 107 and to one terminal of the secondary of transformer 104. The other terminal of the secondary of transformer 104 is connected through capacitor 108 to one side of the primary of the transformer 109, the other terminal of which is grounded. The secondary of transformer 105 in the lateral current circuit is connected in a series circuit including the winding of synchronous rectifier 111 and variable inductor 112; and the secondary of transformer 109 in the normal current circuit is connected in a series circuit including the coil of the synchronous rectifier 113 and variable inductor 114.

With the arrangement heretofore explained, capacitor 108, cooperating with the secondary winding of transformer 104 and the primary of transformer 109, causes the normal current to be displaced approximately 90° from the lateral current. This is perhaps best illustrated in accompanying FIG. 3b wherein the lateral current is depicted as lagging the normal current by substantially 90°. The lateral and normal currents are shown separately in FIG. 3b and the composite field established in the formation adjacent the logging tool 115 might appear as illustrated in FIG. 3c, which composite is merely the algebraic sum of the normal and lateral currents. Naturally enough, the amplitude of the signals will vary depending upon the particular position of the logging tool or, what is the same thing, the instant position of the subsurface formation in which the normal and lateral currents are observed. As a general rule, the lateral current exceeds in amplitude the normal current by some 3 or 4 to 1 and will therefore, predominantly influence the composite curve. Even so, the particular pickup electrodes (121–124) which detect the composite field will determine the relative amplitudes of lateral and normal currents. The composite curve of FIG. 3c is merely exemplary of one possibility and actually represents the composite of the currents flowing through electrodes 106—107 and 107, respectively.

Before discussing the circuits including the coils of rectifiers 111 and 113 which drive the contacts of the synchronous rectifiers to convert the signals detected by electrodes 121–124, it is well to realize that all electro-magnetic synchronous rectifiers presently available have coil to contact time delays, most of which are relatively constant. That is to say, once current is applied to the coil of the synchronous rectifier there follows a certain time delay for flux buildup before the contacts close. This is not unique to synchronous rectifiers but is true of all electromagnetic switching elements. Naturally enough, the actual time lag expressed as degrees of a cycle of the energizing alternating current depends upon the frequency of the alternating current of the driving circuit. Generally, with a frequency in the neighborhood of 300 to 400 cycles per second, the coil to contact delay will be somewhere in the neighborhood of 60° with respect to a full cycle of the current (360°). In order to properly force this delay to a 90° one, variable inductors 112 and 114, respectively, are inserted in the series circuits including the coils of synchronous rectifiers 111 and 113, respectively. By adjustment of the variable inductor 112, for example, the coil to contact delay of rectifier 111 can be set at approximately 90°. This puts in in phase with the normal alternating field.

It will be noted that the coil of rectifier 111 controls contacts 1, 2, 3 and 4 which are a part of the short normal (16" band) and long normal (64" band) signal channels including the pickup electrodes 121 and 122, respectively. Basically what happens then is that the contacts associated with rectifier 111 operate 90° out of phase with the lateral driving current so that the components of the signals detected by electrodes 121 and 122 synchronously rectified by the rectifier 111 represent part of the normal field established between electrode 107 and remote ground.

If there were no coil to contact delay in the devices employed to synchronously rectify the signals and the current fields were separated by substantially 90°, it would be unnecessary to drive the normal signals' rectifier by the lateral current. But since there is a delay of 50° to 60° and the current fields are not maintained 90° apart, it is best to drive the rectifier with a current 90° or 270° out of phase with the signals to be synchronously rectified and use an inductor to force the 50° or 60° lag to 90°. This gives the same result as if there were no coil-to-contact delay, 90° separation between current fields, and the out of phase current is not used.

The coil-to-contact delay of the coil 113 and rectifier contacts 1, 2, 3 and 4 associated therewith is neutralized in a similar fashion. Coil 113 is operated by normal current and the approximate 60° coil-to-contact lag is forced to 90° by adjustment of series inductor 114. As a result, the components of the lateral signals detected by electrodes 123 (10' band) and 124 (18'8" band) which are attributable to the lateral field established between electrodes 106 and 107 are synchronously rectified.

The convenience of forcing the coil-to-contact delay to the 90° phase differential is not the only reason for driving the normal signal rectifier by lateral current and vice-versa. It is apparent that the success of the present phase discriminating system depends to a great extent upon careful maintenance of the phase relations. As noted earlier, if the 90° phase shift between rectifier switching in a channel and the phase of the unwanted signal in that channel varies to any appreciable extent, part of the unwanted signal in that channel will be partially rectified along with the wanted signal. And once rectified, there is no way to separate it from the desired or wanted signal. The variations in phase shift between the normal and lateral current fields are not too important in the circuit arrangement used since any change in the phase of the current establishing that part of the composite field, which when detected is the unwanted signal, is reflected in the switching operation of the rectifier in the same signal channel. That is to say, the contact action or switching of the rectifier changes in step with the phase of the unwanted signal at the rectifier input.

Thus, the system may be described broadly as one in which a pair of phase displaced fields are established simultaneously in the subsurface formations, means are provided to detect the composite of the fields as influenced by the formations, and other means, responsive to the current establishing one of the phase displaced fields, are provided to rectify the part of the composite field contributed by the other one of the fields.

The exemplary system holds the phase relation of the normal and lateral fields at approximately 90° even though it is not necessary. Since integrating filters smooth out the rectified or wanted signals, it is only necessary for the synchronous rectifier to rectify the peaks of the desired A.C. signal that is detected. Of course, the synchronous rectifier must be symmetrical to prevent rectification of part of the unwanted signals in any event.

FIG. 3d illustrates the chopper action of the contacts driven by rectifiers 111 and 113 and FIGS. 3e and 3f the application of the chopper action on the composite signals. As shown, when composite signals from normal electrodes 121 and 122 pass through respective contacts 3—4 and 1—2 controlled by the coil of rectifier 111, the normal components of the signals are converted to D.C. signals. On the other hand, the lateral components pass through as superimposed partially distorted alternating currents. The superimposed distorted A.C. signals represent the unwanted signals in the respective channels and are removed thereafter by filters, as explained below. It should be remembered that the amplitudes of the short and long normals will differ from each other as will the short and long laterals. The examplary wave forms of FIG. 3e are just that; they should not have significance for anything more.

Continuing to look at the normal signal paths including electrodes 121 and 122, it can be seen that electrode 121 is connected through a D.C. blocking capacitor 126 to one side of the primary of isolation transformer 127, the other terminal of which is connected to ground. The terminals of the secondary winding of transformer 127 are connected to respective contacts 3 and 4 associated with the synchronous rectifier 111 and the center tap of the secondary winding of transformer 127 is connected through capacitor 128 to the swinger cooperating with contacts 3 and 4 of chopper 111. The swinger of the chopper 111 is thereafter connected to conductor 7 through a parallel L-C filter including inductor 129 and capacitors 128 and 130.

The normal field established between electrode 107 and remote ground as influenced by adjacent formations is sampled between electrode 121 and remote ground and flows through the primary of transformer 127 with capacitor 126 blocking D.C. signals from reaching the electrode 121 or otherwise interfering with the spontaneous potentials flowing in the formations. As noted, the secondary of transformer 127 is connected across contacts 3 and 4 of the synchronous rectifier 111 and, since the rectifier 111 is phased with the normal field, the rectifier output is synchronously rectified normal signal. The swinger of rectifier 111 is connected to a 0–10 c.p.s. band-pass filter comprising inductor 129 and capacitors 128 and 130. The rectified signal courses this filter, which substantially eliminates the superimposed lateral current, and is connected to the short normal receiving channel over conductors 4 and 7.

In a similar manner, the normal field detected between electrode 122 and remote ground is fed through D.C. blocking capacitor 131 and the primary of transformer 132 with the secondary thereof connected to contacts 1 and 2 associated with rectifier 111. The center tap of the secondary winding of transformer 132 is connected through capacitor 133 to a second swinger associated with rectifier 111. The alternating current signal detected by electrode 122 is synchronously rectified through alternation of contacts 1 and 2 due to the in-phase operation of rectifier 111. The output traverses the 0–10 c.p.s. band-pass filter including inductor 134 and capacitors 133 and 135 to conductor 5 which, in turn, connects it to the long normal recording channel at the surface equipment.

As indicated above in considering the paths of the SN and LN signals, which are detected by respective electrodes 121 and 122, the filters including the respective inductor-capacitors components 129—128, 130 and 134—133, 135 eliminate most of the detected lateral currents superimposed on the rectified normal signals. As a result, the signal appearing between conductors 4 and 7

(SN receiving channel input) represents the detected 16" normal as a D.C. signal. In the same manner, the signal appearing between conductors 4 and 5 (LN receiving channel input) represents a D.C. equivalent of the detected 64" normal signal with most of the superimposed alternating current lateral signal eliminated therefrom.

Before tracing these normal D.-C. signals through their respective recording channels at the surface, it is well to consider the circuits and operation by which the two lateral signals are detected, synchronously rectified and separated from normal field influence, and applied to conductors for transmission to the surface recording equipment.

The short lateral (10') signals are detected between electrode 123 and sheath ground and connected across the primary of transformer 142. A D.-C. blocking capacitor 141 is inserted in the circuit to prevent shorting of S.P. currents circulating in the formations. The secondary winding of transformer 142 is connected, in a manner similar to the secondary winding of transformer 127, to respective contacts 3 and 4 associated with lateral channel synchronous rectifier 113, the circuit of which was previously identified. The center tap of the secondary winding of transformer 142 is connected through a capacitor 143 to the swinger associated with rectifier 113. Since the chopper 113, though driven by normal current, is operated in phase with the lateral field (as a result of coil-contact lag induced by inductor 114), contacts 3 and 4 associated therewith synchronously rectify the lateral signal appearing at the input to the low-pass filter including capacitors 143 and 145 and inductor 146. The result is the rectified lateral signal with superimposed normal A.-C. signals. The low-pass filter noted eliminates most of the superimposed field and provides between conductors 3 and 4 a signal representing the D.-C. equivalent of the detected short lateral signal.

Long lateral (18'8") signals are detected between electrode 124 and sheath ground and applied via blocking capacitor 151 across the primary of transformer 152. The secondary of transformer 152 is connected at each terminal to contacts 1 and 2, respectively, of the synchronous rectifier 113. The center tap of the secondary of transformer 152 is connected through capacitor 153 to the swinger of the coil 113, and the rectified lateral signals with superimposed normal A.-C. signals thereon are passed through the low-pass filter including capacitors 153 and 154 and inductor 155 to conductors 2 and 4 for transmission to the surface equipment. The filter including capacitors 153 and 154 and inductor 155 removes most of the superimposed normal signal from the lateral channel.

At the surface, the 16" normal signal, which was transmitted to the surface equipment over conductors 4 and 7, is connected through sensitivity adjustment circuit 161 and low-pass filter 162 to a recorder 163. The sensitivity adjustment circuit 161 is only a variable resistor which permits the setting of a given sensitivity into the SN channel. The low-pass filter 162 passes approximately a 0 to 10 c.p.s. band and constitutes an M-derived filter including capacitors 163a—4—5 and inductor 166. The output from the filter 162, which acts to remove any extraneous alternating currents including residual lateral signals, is fed into the recorder 163 that includes a sensitivity standardization potentiometer 167 and galvanometers 168, 169 and 170. Galvanometers 169 and 170 are respectively shunted by potentiometers 171 and 172. The galvanometers 168–170 provide means for presenting a multiplied resistivity signal on galvanometer 168, a unitary signal on galvanometer 169 and a $\frac{1}{10}$ unity on galvanometer 170. Naturally enough, recorder 163 can cooperate with a film transport of some sort to permanently record the changing pattern of the short normal resistivities.

The 64" normal signals are transmitted to the surface equipment over conductors 4 and 5 and, there they traverse sensitivity adjustor 175 and low-pass filter 176 to the recorder 177. The sensitivity adjustment 175 acts in exactly the same way as sensitivity adjustment 161 in the SN receiving channel and low-pass filter 176 is similar in operation and construction to filter 162. The recording circuit 177 includes galvanometers 178 and 179 cooperating with a sensitivity standardization potentiometer 180 and variable resistor 181 in shunt of galvanometer 179. This provides a full scale reading of the 64" normal signals on galvanometer 178 and a $\frac{1}{10}$ full scale reading on galvanometer 179.

Turning to the detected lateral signals, the 10' lateral signals are transmitted to the surface equipment over conductors 3 and 4 and traverse sensitivity adjustor 184, filter 185 and recorder 187, all of which have functions similar to those considered in connection with the short normal and long normal channels. The 18'8" lateral signals are transmitted to the surface equipment between conductors 2 and 4 and traverse the sensitivity adjustment circuit 191, filter 192 and recorder 193. Here again the circuits are similar to those associated with the short lateral channel, except for various differences in values of components to accommodate different amplitude signals.

With the two normal and two lateral signals recorded by the galvanometers in recorder circuits 163, 177, 187 and 193, it is only necessary to record a spontaneous potential signal to fill out the group of four resistivity curves and an S.P. The S.P. signal is obtained between current electrode 107 (0" band) and surface ground (S.G.) and supplied through a parallel L-C circuit including inductor 201 and capacitor 202 to conductor 6. At the surface, conductor 6 is connected to one side of a normal-reversing switch 203 and the other terminal of the switch in connected to the surface ground 204 (S.G.). The wiper terminals of the double pole reversing switch 203 are connected to the input to filter 208. One input to the filter 208 is connected through a sensitivity adjustment resistor 207. The low-pass filter 208 passes a 0–2 c.p.s. band and comprises and M-derived filter section including inductor 209 and capacitors 210, 211 and 212. One output lead from filter 208 is connected to one side of the galvanometer 205 in the recorder 206 and to one side of sensitivity standardization resistor 215. The other output lead is connected through buck-boost circuit 216 to the other terminals of the galvanometer 205 and the sensitivity standardization resistor 215.

The reversing switch 203 through which spontaneous potential signals are fed is operable to reverse the polarity of the galvanometer terminals so that the S.P. signal registers on scale on the galvanometer 205. The adjustment of the sensitivity potentiometer 207 and the buck-boost circuit are conventional in operation.

Turning to the particular settings of the surface recording equipment associated with the resistivity channels, it is apparent that the sensitivity adjustment circuits 161, 175, 184 and 191 are manipulated to set a desired sensitivity in any one or all of the channels. Naturally enough, these sensitivity potentiometers could be ganged in order to set the sensitivities for all channels at once. The low-pass filters 162, 176, 185 and 192, as noted before, eliminate any spuriously generated A.-C. signals flowing in the recording channels and any other unwanted signals not eliminated by the subsurface filters previously described. The recording devices 163, 177, 187 and 193 temporarily or permanently, depending upon the requirements of the circuit, record the instantaneous values of the 16" and 64" normal and 10' and 18'8" lateral resistivities. All of these recorders can cooperate with a film transport of some sort to provide a continually varying and permanent record of the subsurface resistivities.

How the logging tool 115 is actually caused to traverse the extent of the borehole has not been described in detail because it is conventional and forms no necessary part of the invention. For the particular circuits illustrated, transient responses are quite uncritical, at least at logging speeds up to 200′ per minute. Since this is just about the upper limit for most logging runs, it is apparent that the present system obtains a plurality of normal and lateral resistivity curves along with a spontaneous potential one-all without the disadvantages inherent in switching between lateral and normal current fields.

While the present invention has been disclosed with reference to a particular exemplary embodiment, it should be apparent to those skilled in the art that numerous other arrangements are possible without departing from the spirit and scope of the invention. To this extent, the present invention should not be limited except by the express language of the appended claims.

What is claimed is:

1. In a system for obtaining measurements correlatable with the lithology of subsurface formations surrounding a borehole comprising, in combination, a logging tool including a plurality of electrodes supported thereon, a cable having a plurality of conductors suspending said logging tool in the borehole, surface recording equipment, means cooperating with said cable and operable to cause said logging tool to traverse the extent of the borehole, means including a source of power and selected ones of said conductors and electrodes to establish first and second alternating current fields in the formations adjacent said logging tool, means to phase separate said fields by a preselected number of degrees, means including certain other ones of said electrodes to detect the composite of said fields as influenced by adjacent formations, means responsive to the current establishing said first field to rectify that part of said composite representing the influence of the adjacent formations on the second field and means responsive to the current establishing said second field to rectify that part of said composite representing the influence of the adjacent formations on the first field, means to eliminate the non-rectified parts of the composite signals, and means including other ones of said conductors to transmit said rectified signals to said surface recording equipment.

2. In an electrical logging system for obtaining measurements of subsurface formations surrounding a borehole comprising, in combination, a logging tool including a plurality of electrodes supported thereon, a cable having a plurality of conductors suspending said logging tool in the borehole, means cooperating with said cable and operable to cause said logging tool to traverse the extent of the borehole, means including a source of power to establish first and second alternating current fields simultaneously in the formations adjacent said logging tool, said first and second alternating current fields phase displaced from each other by approximately 90°, means including said plurality of electrodes to detect the composite of said fields as influenced by formations adjacent thereto, means responsive to the current establishing said first field to rectify that part of the composite which is contributed by said second field and means responsive to the curent establishing said second field to rectify that part of the composite which is contributed by said first field, and means to eliminate the non-rectified parts of said composite field.

3. In a system for measuring the resistivity of subsurface formations surrounding a borehole comprising, in combination, a logging tool including a plurality of normal and lateral electrodes, means including a multi-conductor cable to support said logging tool for movement along the extent of the borehole, circuit means to establish simultaneously in the formations adjacent said logging tool a lateral and a normal field, said circuit means including means to shift the phase of the current establishing one of the fields approximately 90° with respect to the current establishing the other field, means including said electrodes to detect the composite of said normal and lateral fields, first means operable to synchronously rectify the normal part of said composite field as detected by said normal electrodes and second means operable to synchronously rectify the lateral part of said composite field as detected by said lateral electrodes, means responsive to the lateral and normal fields, respectively, to enable said first and second rectifying means and to control the time between the enablement of said rectifying means and the rectification of the detected signals, and means including said conductors to transmit said rectified signals to the surface equipment.

4. In a system for measuring the resistivity of subsurface formations surrounding a borehole comprising, in combination, a logging tool including a plurality of current and pickup electrodes, means including a multi-conductor cable to support said logging tool for movement along the extent of the borehole, surface equipment including a source of alternating current, circuit means including two of said conductors, said source and current electrodes to establish simultaneously in the formations adjacent said loging tool a lateral and a normal field, said circuit means including capacitive means to shift the phase of the current establishing one of the fields with respect to the current establishing the other field, means including preselected ones of said pickup electrodes to detect the composite of said normal and lateral fields, first means operable to synchronously rectify the normal part of said composite field as detected by a first group of said pickup electrodes and second means operable to synchronously rectify the lateral part of said composite field as detected by a second group of said pickup electrodes, means responsive to current flow in the lateral and normal field establishing circuits, respectively, to enable said first and second rectifying means and to vary the phase shift between the enablement of said rectifying means and the rectification of the detected signals whereby the phase shift between the part of the composite field appearing at the input of a rectifying means which is not to be rectified by the rectifying means is phase displaced substantially 90° with respect to the operation of the rectifying means, means to eliminate the non-rectified signals, means including unique pairs of said conductors to individually transmit said rectified signals to the surface equipment, and recording means associated with said surface equipment to record the D.-C. signals.

5. In a system for obtaining measurements correlatable with the lithology of subsurface formations surrounding a borehole comprising, in combination, a logging tool including a plurality of current and pickup electrodes, means including a sheathed multi-conductor cable to support said logging tool for movement along the extent of the borehole, surface equipment including a source of constant frequency alternating current, circuit means including one of said conductors, the cable sheath, said source and said current electrodes to establish in the formations adjacent said logging tool simultaneously a lateral and a normal field of alternating current, said circuit means comprising first and second transformers, the primaries of which are serially connected between said current conductor and sheath ground and the secondaries of which are connected, in the case of the first transformer, in a first series circuit between the current electrode which establishes the lateral field and the current electrode which establishes the normal field and, in the case of the second transformer, in a second series circuit between the normal current electrode and sheath ground, means including a capacitor in said second series circuit to shift the phase of the current establishing the normal field a preselected number of degrees with respect to the current establishing the lateral field, means including preselected ones of said pickup electrodes to detect the composite constituting said normal and lateral fields, a first relay operable to synchronously rectify the normal component of said composite field as detected by a first group of said pickup electrodes and a second relay operable to synchronously rectify the lateral component of said composite field as detected by a second group of said pickup electrodes, said first rectifying means providing a D.-C. equivalent of the normal field signal with an A.-C. lateral signal superimposed thereon and said second rectifying means providing a D.-C. equivalent of the lateral field signal with an A.-C. normal signal superimposed thereon, coil means responsive to respective current flow in said lateral and normal field establishing circuits to cause said first and second relays to operate, said coil means cooperating with other means to vary the time delay between the energization of said coil and closure of the contacts of said relays, means to eliminate all superimposed A.-C. signals, means including unique pairs of said conductors to individually channel said rectified signals to said surface equipment, surface means for adjusting the sensitivity of each of the D.-C. signal channels, and recording means associated with said surface equipment to individually record the D.-C. signals as parameters of the resistivities of subsurface formations.

6. An electrical logging system in accordance with claim 5 and including means cooperating with the normal current electrodes to detect spontaneous potentials of the subsurface formations, said means including filter means and a unique one of said conductors for transmitting said signals to the surface equipment, and means associated with the surface equipment to polarize, filter and record said signals.

References Cited in the file of this patent

UNITED STATES PATENTS 2,933,674    Schuster _____ Apr. 19, 1960

UNITED STATES PATENT OFFICE
CERTIFICATE OF CORRECTION

Patent No. 3,069,619                        December 18, 1962

Jefferson P. Lamb

It is hereby certified that error appears in the above numbered patent requiring correction and that the said Letters Patent should read as corrected below.

Column 2, line 50, after "phase" insert -- shift --; column 4, line 7, for "laternating" read -- alternating --; column 10, line 19, for "loging" read -- logging --.

Signed and sealed this 4th day of June 1963.

(SEAL)
Attest:

ERNEST W. SWIDER
Attesting Officer

DAVID L. LADD
Commissioner of Patents